US00RE45459E

(19) United States
(12) Reissued Patent
Hersick et al.

(10) Patent Number: US RE45,459 E
(45) Date of Reissued Patent: Apr. 14, 2015

(54) PROTECTIVE HELMET

(71) Applicant: Mine Safety Appliances Company, Cranberry Township, PA (US)

(72) Inventors: F. Joseph Hersick, Zelienople, PA (US); Kevin R. Ketterer, Portersville, PA (US); Robert E. Klotz, Jefferson Hills, PA (US)

(73) Assignee: MSA Technology, LLC, Cranberry Township, PA (US)

(21) Appl. No.: 14/136,613

(22) Filed: Dec. 20, 2013

Related U.S. Patent Documents

Reissue of:
(64) Patent No.: 8,225,419
Issued: Jul. 24, 2012
Appl. No.: 11/881,605
Filed: Jul. 27, 2007

U.S. Applications:
(60) Provisional application No. 60/844,562, filed on Sep. 14, 2006.

(51) Int. Cl.
*A42B 3/10* (2006.01)

(52) U.S. Cl.
CPC ..... *A42D 3/062* (2013.01)

(58) Field of Classification Search
USPC ..... 2/272, 5, 6.2, 6.3, 6.5–6.7, 421, 422, 2/424, 15, 9
See application file for complete search history.

(56) References Cited

U.S. PATENT DOCUMENTS

| | | | | |
|---|---|---|---|---|
| 4,975,980 | A * | 12/1990 | Ersteniuk | 2/5 |
| 5,044,016 | A | 9/1991 | Coombs | 2/414 |
| 5,517,691 | A * | 5/1996 | Blake | 2/5 |
| 5,555,569 | A | 9/1996 | Lane | |
| 5,898,949 | A * | 5/1999 | Barthold et al. | 2/416 |
| 5,940,891 | A | 8/1999 | Lane | 2/426 |
| 6,032,297 | A * | 3/2000 | Barthold et al. | 2/416 |
| 6,438,763 | B2 * | 8/2002 | Guay et al. | 2/424 |
| 6,711,751 | B1 * | 3/2004 | Muskovitz | 2/410 |
| 2003/0070200 | A1 | 4/2003 | Crye et al. | 2/6.6 |
| 2006/0168712 | A1 | 8/2006 | Mazzoccoli et al. | 2/411 |
| 2007/0056071 | A1 * | 3/2007 | Smith | 2/5 |

* cited by examiner

*Primary Examiner* — Khoa Huynh
*Assistant Examiner* — Andrew W Collins
(74) *Attorney, Agent, or Firm* — Bartony & Associates, LLC

(57) ABSTRACT

A protective helmet includes: a rigid shell including a generally domed-shaped section, a three attenuating liner within the dome-shaped section shell and operatively connected to the rigid shell; and a visor mount in operative connection with the force attenuating liner, the visor mount be adapted to have a visor mounted thereto.

11 Claims, 10 Drawing Sheets

PROTECTIVE HELMET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED U.S. APPLICATION DATA*

*Provisional application No. 60/844,562, filed on Sep. 14, 2006.*

BACKGROUND OF THE INVENTION

The present invention relates generally to protective head gear and, in several embodiments, to protective helmets including a force attenuation liner or impact cap to which a structural mount for a visor is operatively connected.

The following information is provided to assist the reader in understanding the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

Protective head gear is used or should be used in numerous activities in which the head can be impacted, including, but not limited to, sports activities, recreational activities, vehicular operation, work activities in hazardous industrial environments, military operations, aviation, and fire fighting. Such protective head gear typically includes a rigid outer shell of metal or plastic and a suspension system to support the shell on the wearer's head. The rigid outer shell prevents an impacting object from contacting the head and the suspension system operates to attenuate and distribute impact forces transferred to the head.

Impact attenuating suspensions can, for example, include a web of straps attached to the shell and arranged as a cradle over the top of the wearer's head or a compressible foam liner positioned between the wearer's head and the interior of the shell.

U.S. Pat. No. 4,286,339, assigned to the assignee of the present invention, the disclosure of which is incorporated herein by reference, discloses a protective helmet, such as firefighter helmet, which combines aspects of a web suspension with aspects of a foam liner suspension. A chinstrap for the helmet assembly of U.S. Pat. No. 4,286,339 is rigidly affixed to the outer shell to retain the protective helmet on the head. Fixing the chinstrap to the outer shell in an unyielding manner, however, can potentially place too much force on the wearer's neck under certain circumstances (for example, during a fall through a floor in the case where the helmet impacts an object or becomes stuck).

To reduce the likelihood of placing excessive force on the neck, a number of protective helmets have included a chinstrap assembly that is releasably attached to the protective helmet assembly. Typically, detachment of the entire protective helmet assembly from the user left the user's head completely unprotected against subsequent impacts with an object or against a stationary object.

U.S. Pat. No. 5,044,016, assigned to the assignee of the present invention, the disclosure of which is incorporated herein by reference, describes a helmet assembly including an outer shell and an inner impact attenuation liner assembly. A chinstrap assembly is mounted to the inner impact attenuation liner assembly and the inner impact attenuation liner assembly is mounted within the outer impact shell such that it detaches under predetermined load conditions from the outer impact shell. After separation of the inner liner assembly from the outer shell, the inner liner assembly remains on the user's head. The inner liner assembly thus continues to provide the user with some protection from subsequent impacts.

Although significant improvements have been made in protective helmets, it remains desirable to develop improved protective head gear.

SUMMARY OF THE INVENTION

In one aspect, the present invention provides a protective helmet including: a rigid shell including a generally domed-shaped section, a force attenuating liner within the dome-shaped section shell and operatively connected to the rigid shell; and a visor mount in operative connection with the force attenuating liner, the visor mount be adapted to have a visor mounted thereto.

The visor mount can include a section that extends at least partially around an outer surface of the force attenuating liner. The section of the visor mount can, for example, extend over a top of the force attenuating liner.

In one embodiment, the rigid shell includes a rib extending side to side over a top of the dome-shaped section, and at least a portion of the visor mount is located within an interior portion of the rib. In another embodiment, the dome-shaped section of the rigid shell includes a rib extending front to back, and at least a portion of the visor mount is located within the top center portion of the rib. In a further embodiment, the dome-shaped section of the rigid shell is generally rounded over the dome-shaped section, and at least a portion of the visor mount is located adjacent to an interior surface of the dome shaped section.

The section of the visor mount can also extend around a side of the force attenuating liner. The section of the visor mount can, for example, extend around a perimeter of the force attenuating liner.

The force attenuating liner can be adapted to disconnect from operative connection with the shell under a predetermined load. In several embodiments, the visor mount is adapted to remain in connection with the force attenuating liner upon disconnection of the force attenuating liner from operative connection with the shell.

The visor mount can be operatively connected to the shell. The visor mount can, for example, be adapted to disconnect from operative connection with the shell under a predetermined load. The visor mount can be adapted to remain in connection with the force attenuating liner upon disconnection of the visor mount and the force attenuating liner from operative connection with the shell.

In another aspect, the present invention provides a protective helmet including a shell and a connector system connected to the shell for attaching a visor to the helmet. The shell includes a dome-shaped section. The connector system includes a first connector attached to a first side of the shell and a second connector attached to a second side of the shell. Each of the first connector and the second connector include a seating for removable connection of a cooperating connector positioned on each side of the visor so that the visor is rotatably attachable to the helmet such that the visor can be rotated to a stowed position within the dome-shaped section of the shell and to a deployed position outside of the dome-shaped section of the shell. The seating can, for example, include abutment members that form a removable connection with flexing capture arms of the cooperating connector of the visor. A shield portion of the visor can be rotatably attached to the cooperating connectors of the visor.

In still another aspect, the present invention provides a force attenuating liner for use in a protective helmet including a visor mount operatively connected to the force attenuating liner, the visor mount be adapted to have a visor mounted thereto.

The present invention, along with the attributes and attendant advantages thereof, will best be appreciated and understood in view of the following detailed description taken in conjunction with the accompanying drawings.

DETAILED DESCRIPTION OF THE INVENTION

Several representative embodiments of protective head gear of the present invention are discussed herein in connection with various firefighter helmets. One skilled in the art appreciates, however, that the devices, systems and methods of the present invention can be used in a wide variety of protective head gear.

In the 19$^{th}$ century, firefighters in the United States commonly used leather helmets which included a long rear brim and curled up side brims to prevent water from running down the firefighter's neck and into his coat. Leather helmets, which are still popular among firefighters today, are strong enough to provide protection from failing objects, and the large brim of the traditional leather helmets sheds water effectively and prevents objects from dropping down the back of the fire fighter's neck.

In addition to leather, modern firefighter helmets, including those of a traditional design (that is, similar in appearance to traditional leather helmets), are often fabricated from high-tech plastic and composite materials. To satisfy the NFPA standard, firefighter helmets are usually fabricated from highly impact resistant and thermally stable materials such as thermosets (for example, fiberglass composites including vinylester/polyester thermoset resins). For example, the CAIRNS® 1010 helmet, available from Mine Safety Appliances Company ("MSA"), is an NFPA approved helmet fabricated from fiberglass composites, which can be reinforced with ballistic-grade KEVLAR® material (poly(ρ-phenylene-terephtalamide), available from Dupont of Wilmington, Del.).

Figure 1:
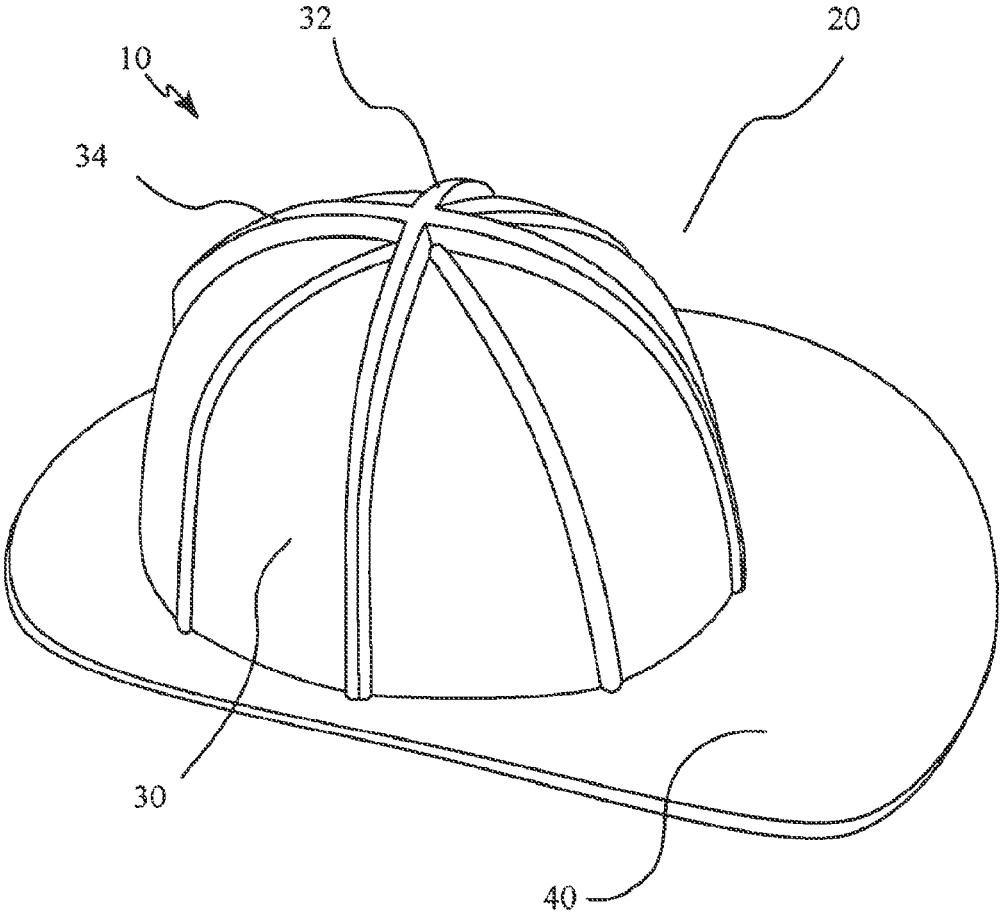
FIG. 1 illustrates a top perspective view of a traditional style fire helmet of the present invention.

Firefighter's helmets can take a variety of forms as, for example, disclosed in U.S. Pat. Nos. 4,286,339, 5,044,016 and 6,260,212, assigned to the assignee of the present invention, the disclosures of which are incorporated herein by reference. FIG. 1 illustrates one embodiment of the present invention that has the "traditional" shape. However, as is clear to one skilled in the art of protective helmets, the protective helmets of the present invention can have generally any shape suitable for protective headgear.

Firefighter protective helmet 10 includes an outer shell 20. Outer shell 20 is formed with a generally dome-shaped section 30 and a radially outward extending brim 40 which can be wider at the back than at the front and on the sides to shield the back of the wearer's neck. An inner impact attenuation liner assembly or impact cap assembly 100 (not shown in FIG. 1; see, for example, FIGS. 2 through 4) can be positioned within domed-shaped section 30 of outer shell 20. "Traditional" style helmet 10 further includes several ribs extending over dome-shaped section 30. In the illustrated embodiment, a major or larger ridge or rib 32 extends from one side to another over dome-shaped section 30. Another major or larger ridge or rib 34 extends front to back over dome-shaped section 30.

As discussed above, the protective helmets of the present invention can have generally any shape suitable for protective headgear. For example, "modern" style or shaped firefighter helmets and other helmets suitable for use in the present invention can have a narrower brim than brim 40 illustrated for helmet 10 or have no brim at all. Moreover, such protective helmets can be smooth/rounded (that is, without ridges or ribs) over a dome-shaped section thereof or can have different ridging or ribbing than appears in the traditional style firefighter helmet. For example, a number of protective helmets include a single, relatively large ridge or rib extending front to back over a dome-shaped section of the protective helmet.

As used herein terms such as "side", "front", "back", "up", "down", "inward", "outward" and similar terms when used to refer to helmet 10 or any portion thereof refer to a direction relative to the orientation of helmet 10 (or a portion thereof) when helmet 10 is worn by a user.

In several embodiments of the present invention, an eye protection shield, face shield or visor 200 (see, for example, FIGS. 2A through 7D), including a shield section 204, is in operative connection with impact attenuation liner assembly or impact cap 100. In that regard, a structural mount 300 (see, for example, FIGS. 2A through 4, and 6 through 7D) for visor 200 can be placed in operative connection with impact cap 100. A connector 340 can, for example, be provided for a relatively ready or quick connection of visor 200 thereto. In several embodiments of the present invention as used in connection with protective firefighter helmets of the traditional style, a hoop section 310 of mount 300 which extends over the top of impact cap 100 is positioned and dimensioned so that it is located or seated within an internal recess of dome-shaped section 30 created by the formation by rib or ridge 32. In another style of a helmet of the present invention wherein a generally dome-shaped section includes only a ridge or rib extending front to back, at a least a portion of a visor mount similar to visor mount 300 can, for example, be located within the top center portion of the ridge or rib. In other protective helmets of the present invention in which the dome-shaped section is generally smoothly curved or rounded (without ridges or ribs), the visor mount can, for example, simply be located adjacent to the interior surface of the dome-shaped section.

As known in the art, impact cap 100 can, for example, be fabricated from a foamed material such as a foamed urethane or other foamed polymeric material that is suitable to attenuate impact forces. In the illustrated embodiment, impact cap 100 includes a force attenuating and/or distributing upper section 110 formed from a foamed urethane material and a lower section 160 formed from a molded (for example, vacuum molded) thermoplastic polymeric material such as ABS (acrylonitrile-butadiene-styrene). As illustrated, for example, in FIG. 4, lower section 160 is formed with a seating 164 around the lower perimeter thereof in which the lower perimeter of upper section 110 is seated when the two sections are assembled. The outer surface of dome-shaped section 170 of the lower section 160 is shaped and dimensioned to generally conform to the inner surface of upper section 110. Lower section 160 can, for example, facilitate cleaning of impact cap 100 as a relatively smooth, molded thermoplastic material is, for example, more readily wiped clean than a foamed material. Further, lower section 160 can prevent damage to friable upper section 110.

Figure 4:
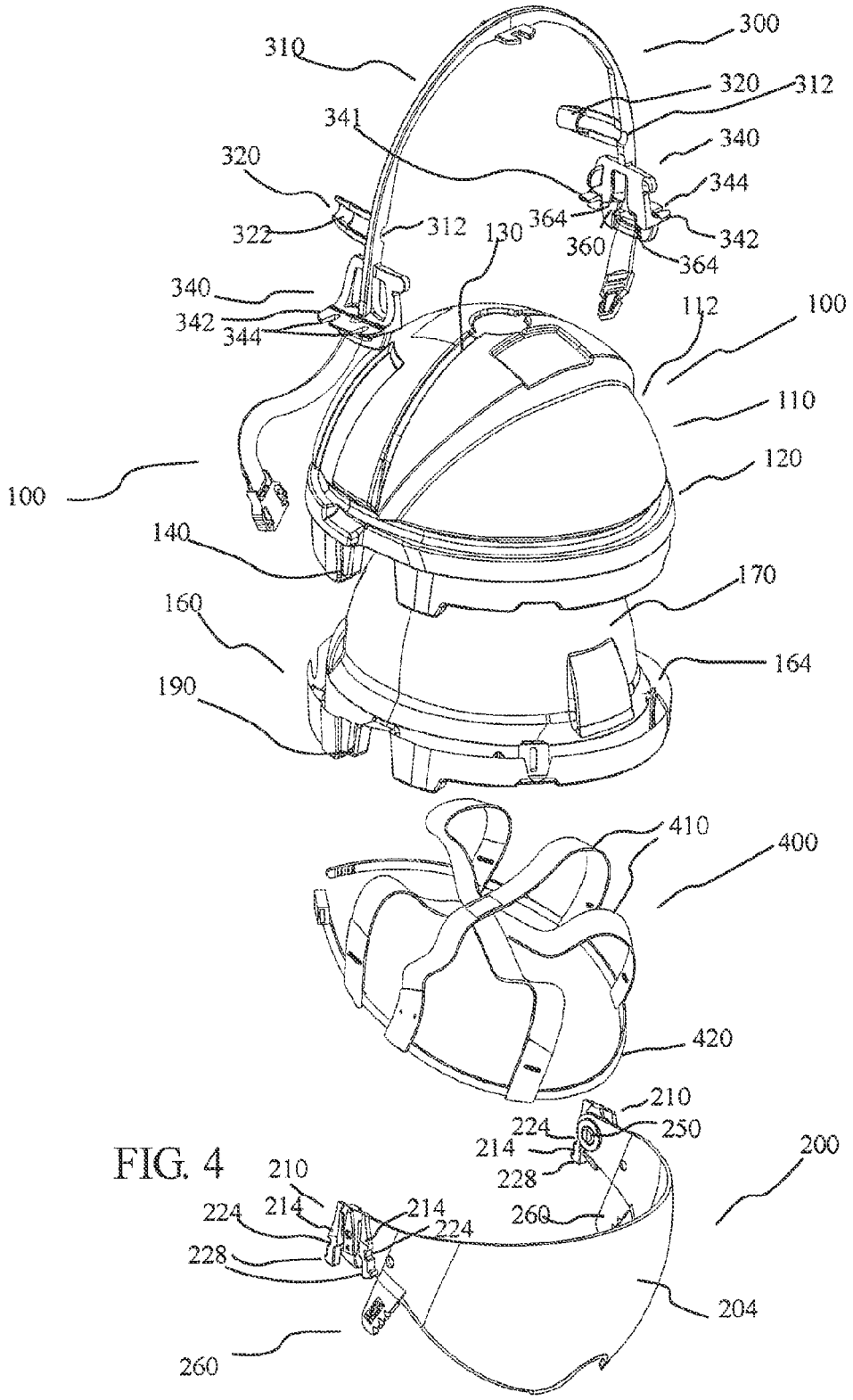
FIG. 4 illustrates a perspective view of the impact cap of FIG. 2A in a disassembled state.

As also illustrated, for example, in FIG. 4, a web suspension 400 can be in operative connection with impact cap 100. Web suspension 400 is connected to impact cap 100 via an extending member such as a tie strap 420. Tie strap 420 is seated or positioned within a groove or seating 120 formed in upper section 110 of impact cap 100. When assembled, tie strap 420 retains web suspension 400 in operative connection with impact cap 100. Web straps 410 pass over and around the lower perimeter of lower section 160 of impact cap 100 and assist in maintaining upper section 110 and lower section 160 in operative connection.

Mount 300 can, for example, be formed from a material of greater structural integrity than the friable foamed material of upper section 110 of impact cap 100 and provides structural support for the mounting of visor 200. Mount 300 can, for example, be formed by injection molding of a thermoplastic material such as nylon. In the illustrated embodiment, mount 300 can assist in maintaining proper alignment of impact cap 100 with helmet shell 20 (for example, via seating of hoop section 310 within the interior of rib or ridge 32) and proper alignment of visor 200 with impact cap 100 and helmet shell 20. As illustrated, for example, in FIG. 3B, visor 200 can be rotated to a recessed or stowed position in which it is positioned between impact cap 100 and shell 20 of helmet 10, within dome-shaped section 30. Upper section 110 can, for example, include a recess 112 formed therein for positioning of visor 200 in the stowed position. For use in shielding the eyes and upper face of the wearer of helmet 10, visor 200 can be rotated downward to be positioned in a deployed position in front of the face of the user as, for example, illustrated in FIG. 3A.

In addition to facilitating, alignment of impact cap 100 within helmet shell 20, placing hoop section 310 of mount 300 within the internal recess of rib or ridge 32 as described above reduces or eliminates internal projections into helmet shell 20. Mount 300 also interconnects outer shell 20 and impact cap assembly 100 by acting as an intermediate structure member upon complete assembly, assisting in preventing motion of impact cap 100 relative to helmet shell 20 during normal use.

In the embodiment illustrated in FIGS. 1 through 7D, hoop section 310 of mount 300 seats or is positioned within a groove or seating 130 formed in upper section 110 of impact cap 100. Upper section 110 and lower section 160 also include openings or seatings 140 and 190, respectively, with which connectors 340 align upon assembly, Connectors 340 can also include a tab or flange 341 that seats or is positioned within a seating 164 of lower section 160 to, for example, assist in proper alignment of mount 300 on impact cap 100.

In the illustrated embodiment, mount 300 includes extending members 320, which extend from hoop section 310 of mount 300. Extending members 320 are shaped to conform generally to groove or seating 120 of impact cap 100 (see, for example, FIGS. 3A and 3B). Hoop section 310 can include a notch or channel 312 formed therein where hoop section 310 passes over groove 120 to allow tie strap 420 to pass thereunder without contacting hoop section 310. Tie strap 420 passes over a groove or seating 322 formed in extending members 320 and assists in maintaining mount 300 in operative connection with impact section 100.

Figure 2A:
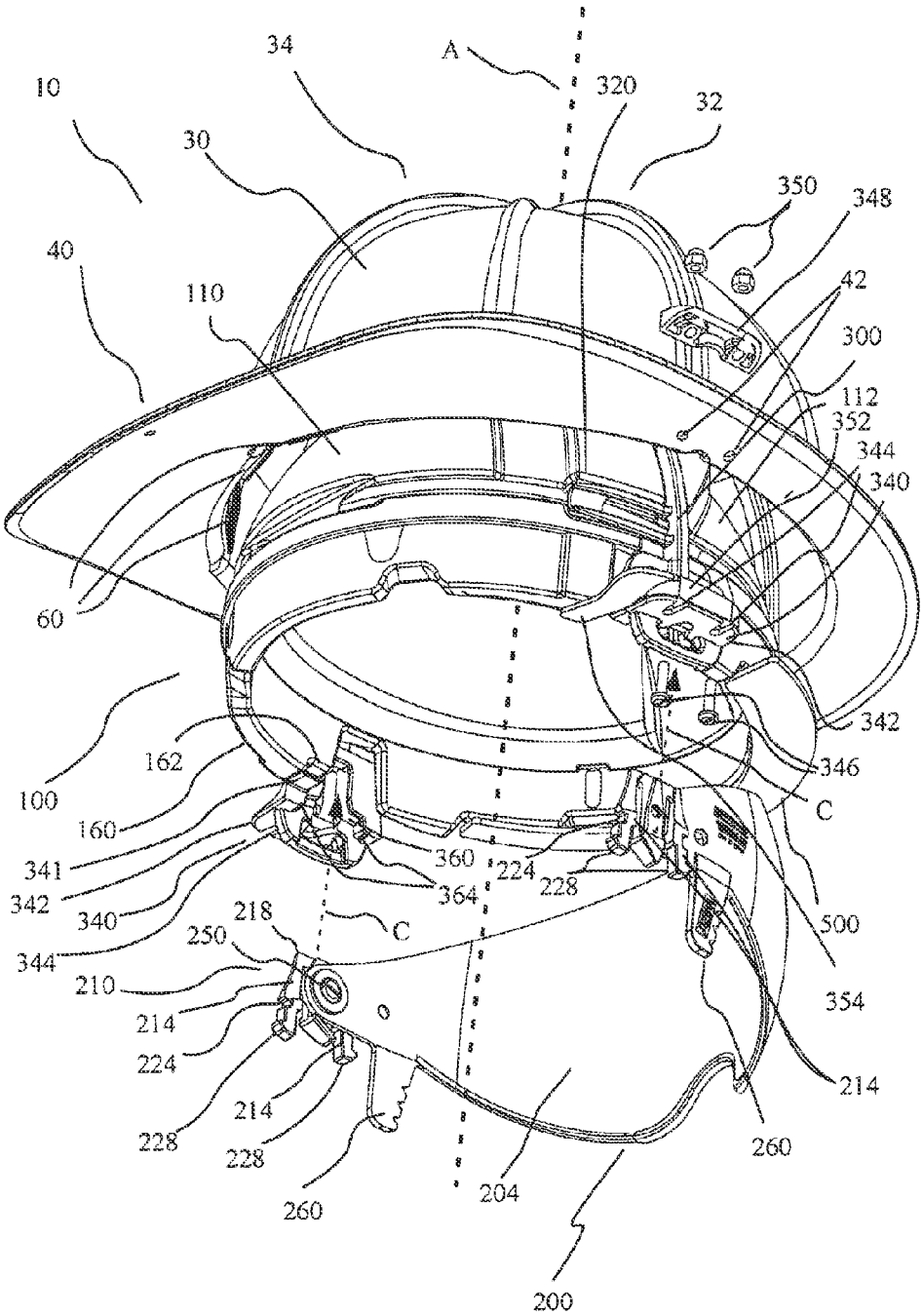
FIG. 2A illustrates a bottom perspective view of an embodiment of a protective helmet of the present invention in a disassembled state including a force attenuation and/or distribution liner or impact cap assembly of the present invention, wherein a visor is attached to a structural mount or support in operative connection with the impact cap assembly.

As illustrated in, for example, FIG. 2A, each of connectors 340 includes a flange 342 that extends radially outward. Flange 342 includes two slots 344. Screws 346 pass though slots and through holes 42 in brim 40. A stabilizing member 348 can be provided to assist in aligning and stabilizing nuts 350 which cooperate with screws 346 to connect connectors 340 (and thereby impact cap 100) to helmet shell 20.

Upon application of a predetermined force or predetermined load to helmet shell 20 that could result in undue stress on the wearer's neck (for example, in a case that the helmet impacts an object or becomes stuck during a fall), flange 342 will deform and slide out from under screws 346 to enable disconnection of connectors 340, and thereby impact cap 100, from helmet shell 20. The NFPA 1971 standard, for example, indicates that separation should occur upon application of a downward load of no less than 80 pounds applied to the impact cap. Each of connectors 340 can also include a member 352 (see, for example, FIG. 2A) in operative connection therewith via screws 346 which includes a radially inward extending flange 354. Members 352 remain in connection with helmet shell 20 when impact cap 100 disconnects from helmet shell 20 via screws 346 which pass through holes (not shown) in members 352. Flanges 354 are deformable to allow disconnection of impact assembly 100 from connection with helmet shell 20. In the case of, for example, certain side impacts (which can cause deformation of helmet shell 20) in which it is undesirable for impact cap 100 to disconnect from helmet 10, flanges 354 can assist stabilizing the assembly and preventing undesirable disconnection. However, in the case of application of force to helmet 10 which would otherwise cause excessive force on the neck of the wearer as described above, both flange 342 and flange 354 deflect to allow impact cap 100, including connected visor 200 to disconnect from helmet shell 20.

In the illustrated embodiment, mount 300 including hoop section 310, extending member 320 and connectors 340 was molded monolithically from a thermoplastic material. The thermoplastic material is preferably suitably compliant to allow disconnection of connectors 340 from connection with helmet shell 20 as described above. Extending members 320 act in the manner of leaf springs in connecting mount to upper section 110 of impact cap 100. Extending members 320 have flexibility and absorb energy, preventing breakage (and retaining the assembled nature of impact cap assembly 100) upon application of a force thereto or to impact cap 100. The thermoplastic material of mount 300 is also preferably has suitable rigidity to provide secure connection of cooperating visor connectors 210 to connectors 340 as described above.

As mount 300 and visor 200 remain in operative connection with impact cap 100 after impact cap assembly 100 breaks away from helmet shell 20, visor 200 can continue to provide eye protection after break away of helmet shell 20 from impact cap 100.

As described above, connectors 340 of mount 300 also provide for connection of visor 200 to connector 340 and thereby to impact cap 100. In the illustrated embodiment, visor 200 includes a cooperating connector 210 that includes two flexing capture legs 214. As cooperating connectors 210 are moved upward (represented by arrows C set forth in FIG. 2A) into contact with connector 340, an upper end 218 of cooperating connector 210 enters an opening 360 formed on an inner side or connector 340. Flexing capture legs 214 are force toward each other by contact with abutment members 364 on the sides of opening 360 until abutment members 364 are aligned with notches or seatings 224 formed in capture legs 214. At that point, capture legs 214 flex away from each other so that notches 224 form an engagement with abutment members 364 to retain cooperating connectors 210 (and thereby visor 200) in removable connection with connectors 340.

To remove visor 200 from connection with connectors 340, a user can force flexing capture legs 214 toward each other to remove notches 214 from cooperating contact with abutment members 364 by application of force to ends 228 of capture legs 214. The cooperation of connectors 340 and 210 to removably connect visor 200 to the helmet assembly provides, for example, for simple removal of visor 200 for periodic cleaning or for replacement by another visor.

The cooperating connection between connector 340 and connector 210 of visor 200 also provides advantage even when used directly on helmet shell 20 and not as part of breakaway impact cap assembly 100. In that regard, unlike a number of other connection mechanism for attaching visors and other accessories to helmets the connection formed in the present invention is very simple and does not require tools for either connection or disconnection. Further the, connection is formed on the inside perimeter of dome-shaped section 30 and provides for a stowed position of visor 200 between helmet shell 20 and impact cap 100. In that interior position, visor 200 is protected from dirt, damage caused by contact with various object and damage caused by exposure to elevated temperatures.

Figure 2B:
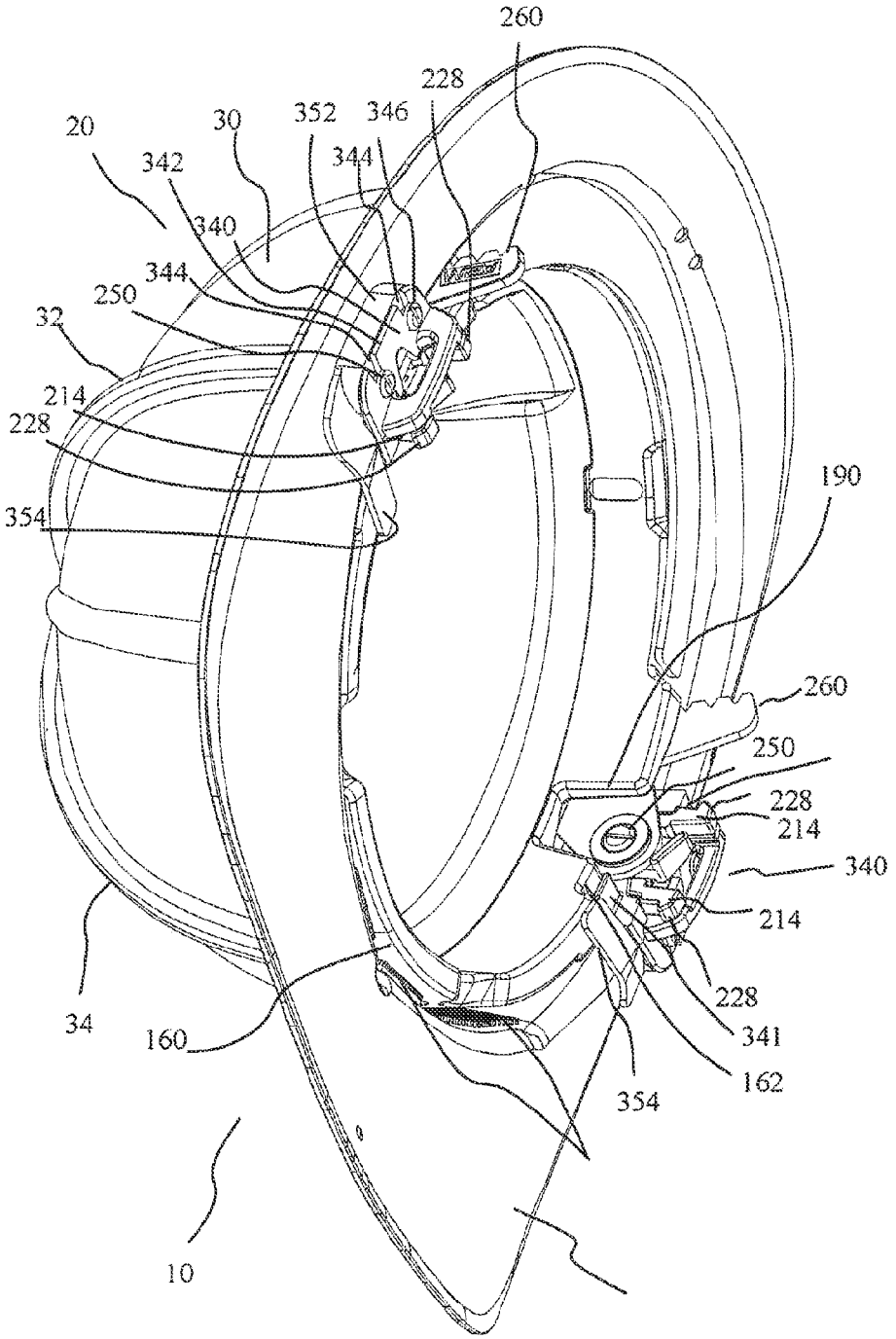
FIG. 2B illustrates a bottom perspective view of the helmet assembly of FIG. 2A in an assembled state.

To further protect visor 200 from dirt and exposure to heated air, a shield 500 can be provided to prevent dirt and air from entering between helmet shell 20 and impact cap 200. Shield 500 can extend around the gap between helmet shell 20 and impact cap 100 only in the vicinity of visor 200 or can extend further around the gap. Shield 500 can even extend around the entire circumference of the gap. In several embodiments, shield 500 extends around a front section of the gap as illustrated in FIGS. 2A and 2B. In several such embodiments, an ear/neck flap or shield (as known in the art) is removably attachable to several hook-and-loop type fasteners 60 positioned around the interior of the back of dome-shaped section 30 and further prevents dirt and heated air from entering the gap between helmet shell 20 and impact cap 100.

Figure 3A:
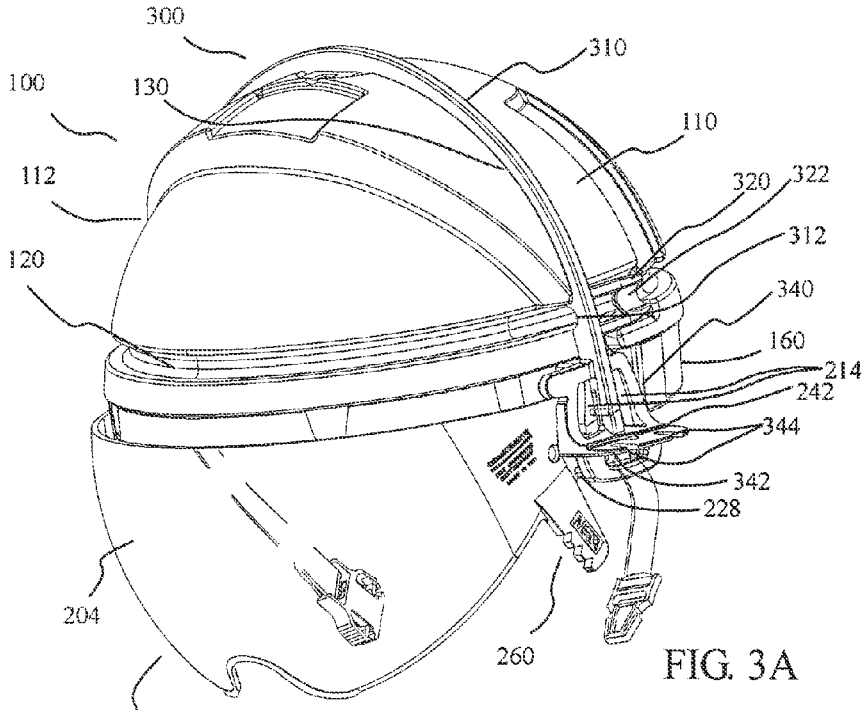
FIG. 3A illustrates a perspective view of the impact cap of FIG. 2A with the visor in a deployed state.
Figure 3B:
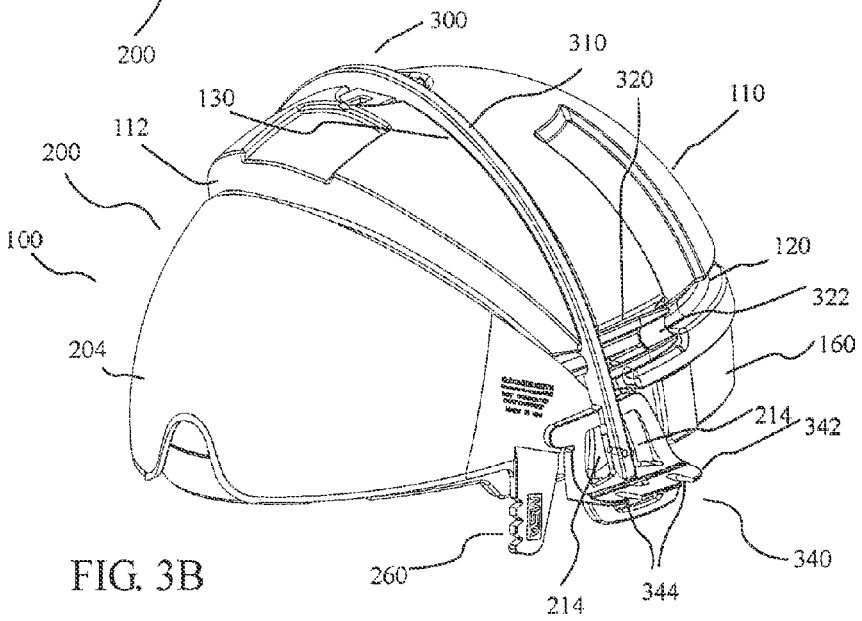
FIG. 3B illustrates a perspective view of the impact cap of FIG. 2A with the visor in a stowed state.
Figure 5A:
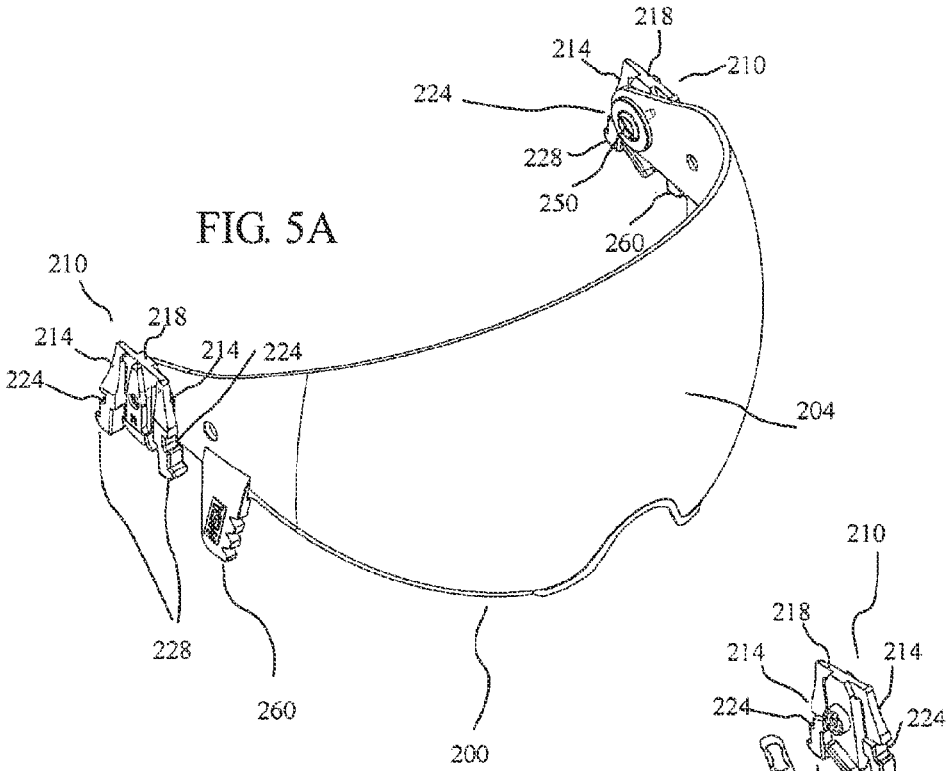
FIG. 5A illustrates a perspective view of the visor assembly of FIG. 2A in an assembled state.
Figure 5B:
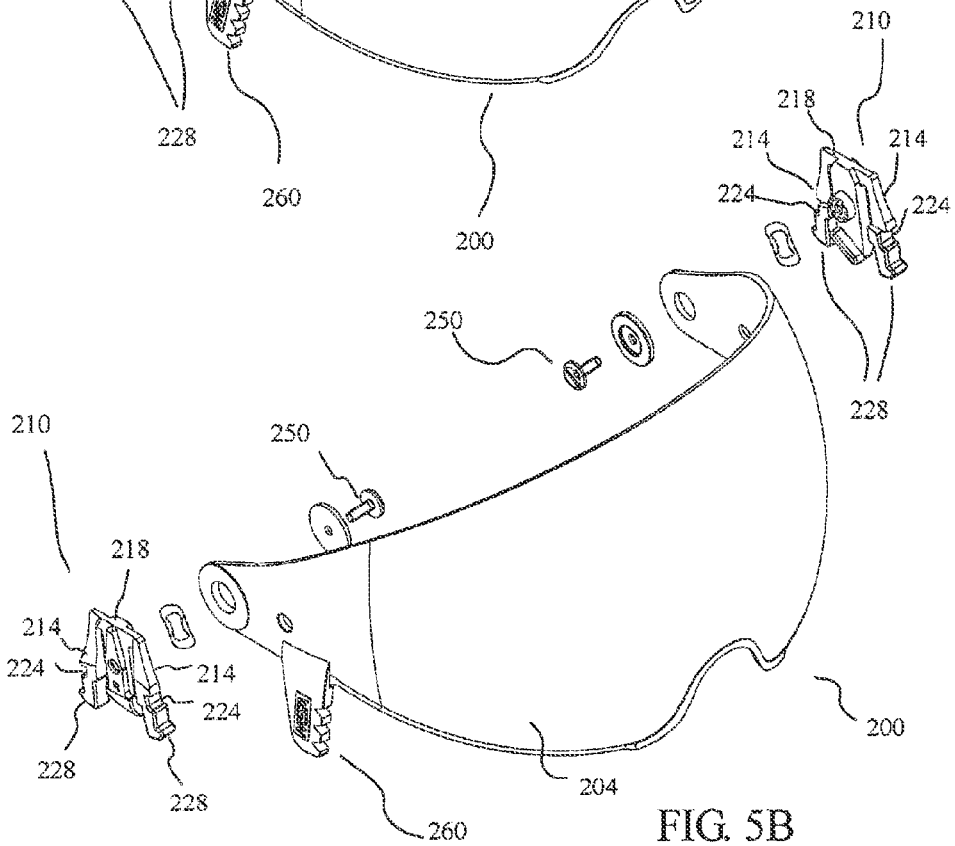
FIG. 5B illustrates a perspective view of the visor assembly of FIG. 2A in a disassembled state.
Figure 6:
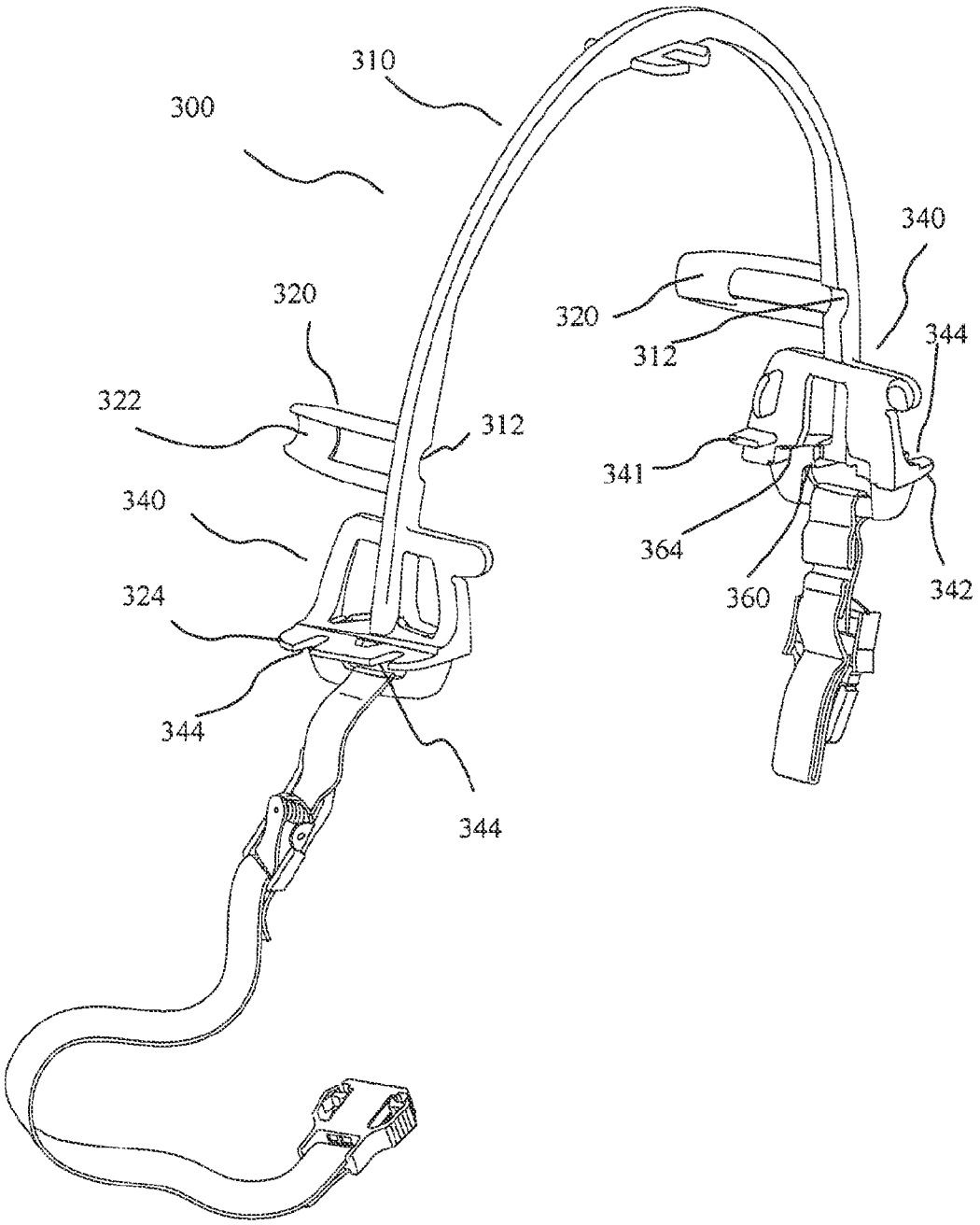
FIG. 6 illustrates a perspective view of the mount for the visor assembly of FIG. 2A with a chin strap attached thereto.
Figure 7A:
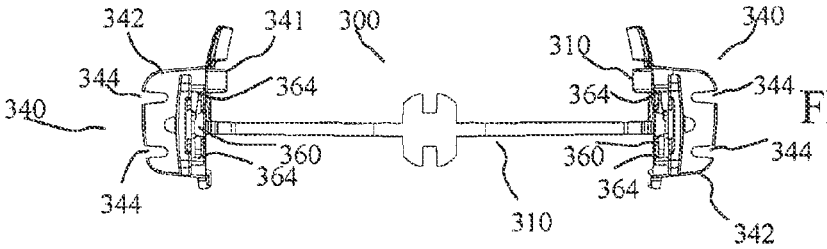
FIG. 7A illustrate a top view of the mount of FIG. 6.
Figure 7B:
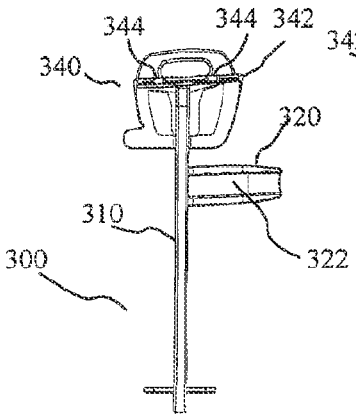
FIG. 7B illustrates a side view of the mount of FIG. 6.
Figure 7C:
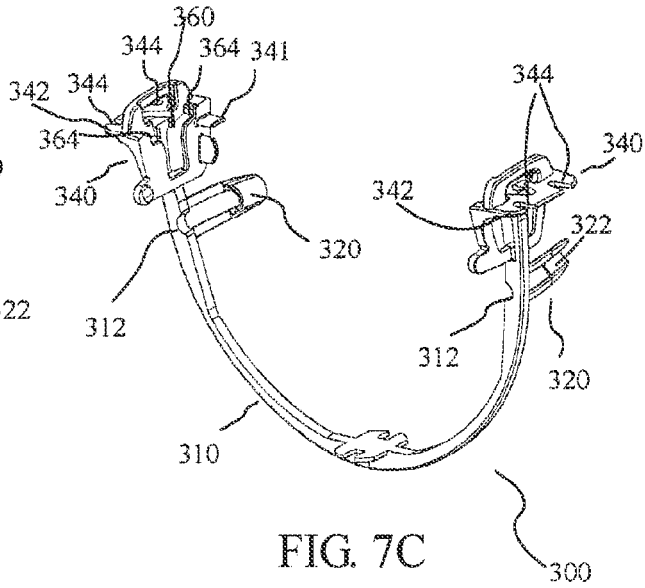
FIG. 7C illustrates another perspective view of the mount of FIG. 6.
Figure 7D:
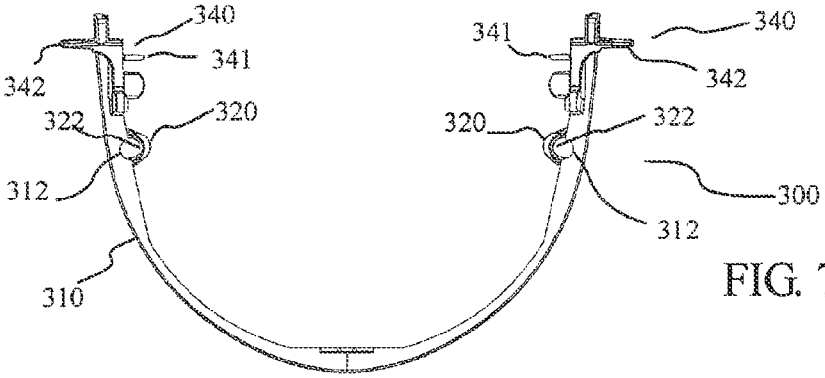
FIG. 7D illustrates a rear view of the mount of FIG. 6.

As illustrated, for example, in FIGS. 5A and 5B, visor 200 can be pivotably or rotatably attached to connectors 210 about a shaft such as provided by a tension screw 250 which can, for example, be adjustable to set the amount of force required to rotate visor between the stowed position (illustrated, for example, in FIG. 3B) and the deployed position (illustrated, for example, in FIG. 3A). Handles or flanges 260 can be provided for grasping by the wearer of helmet 10 to facilitate stowing and deployment of visor 200.

Figure 8A:
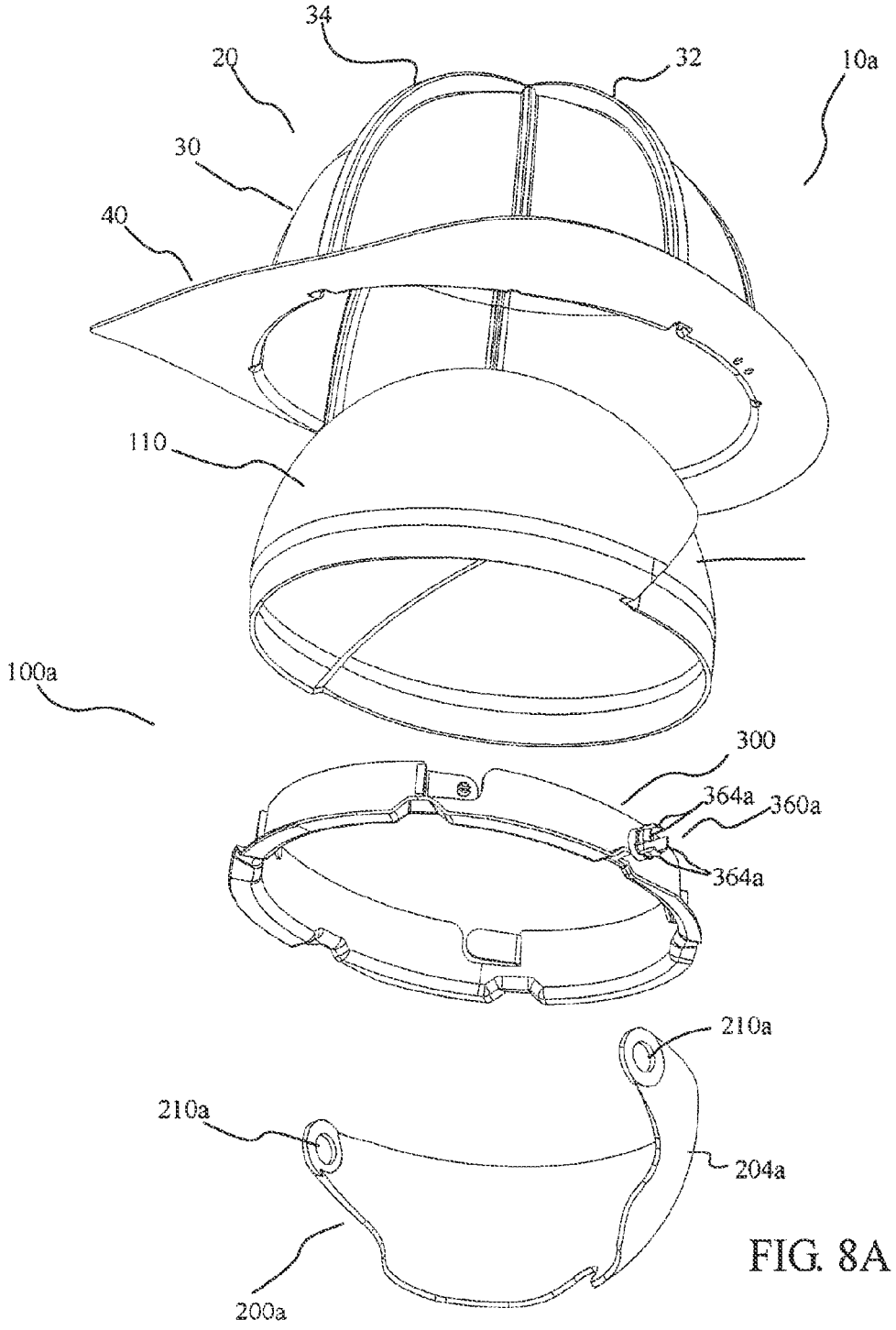
FIG. 8A illustrates a bottom perspective view of an embodiment of a protective helmet of the present invention including a force attenuation/distribution liner or impact cap assembly including a structural mount for a visor wherein the structural mount extends around the lower side perimeter of the impact cap.

FIG. 8A illustrates another embodiment of an impact cap assembly 100a of the present invention in which a structural mount 300 encompasses the lower perimeter of an upper force absorbing or attenuating section 110 of impact cap 100a, rather than extending from one side to another over the top of impact cap 100 as described in the above embodiments. Visor 200a is connected to mount 300 via a pivot connection 360a. In the illustrated embodiment, passages 210a formed on the sides of visor 200a are captured by flexing capture arms 364a of connectors 360a. Breakaway attachments (for example, similar to those described above but not shown in FIG. 8A) can be provided around the circumference of mount 300 for breakaway attachment of mount 300 to shell 20 of helmet 10a.

Figure 8B:
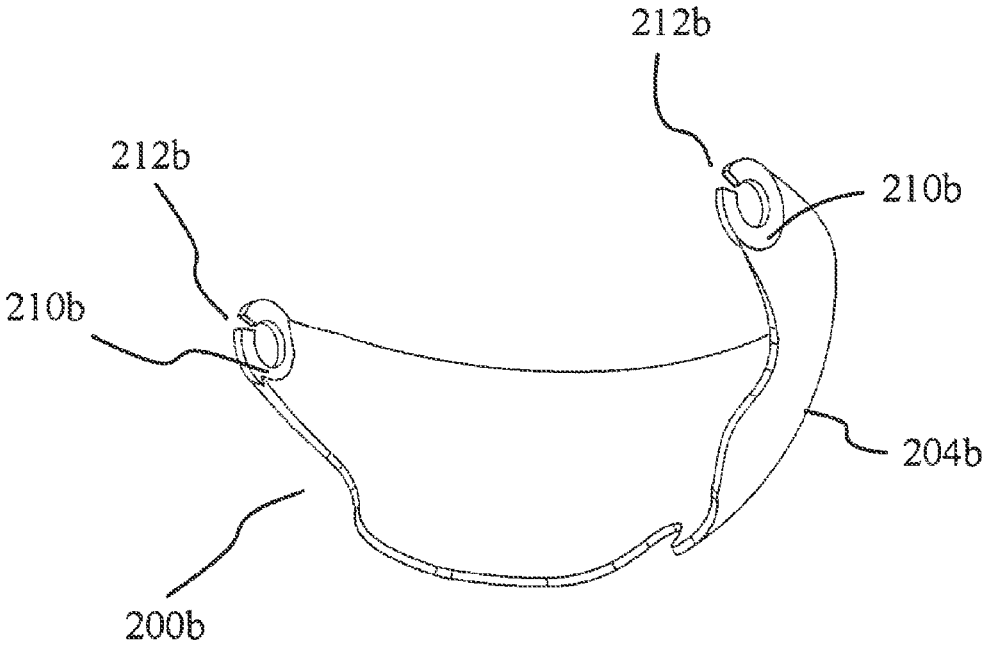
FIG. 8B illustrates a perspective view of another embodiment of a visor for use in connection with the impact cap of FIG. 8A.

FIG. 8B illustrates another embodiment of a visor 200b for use in connection with pivot connection 360 of mount 300. In the embodiment of FIG. 8B, visor 200b includes openings 212b that can be used to form a connection with pivot connection 360. In that regard, openings 212b can be aligned with pivot connection 360 and force applied to visor 200b causing openings 212b to spread so that pivot connection 360 can be seated within passages 210b.

In either of visors 200a or 200b, passages 210a and 210b, respectively, can be dimensioned so that some resistance is maintained to pivoting motion of visor 200a or 200b, thereby providing a mechanism to hold visor 200a or 200b in a desired position.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A protective helmet comprising:

a rigid shell including a generally domed-shaped section, a force attenuating liner within the dome-shaped section of the rigid shell and operatively connected to the rigid shell; and a visor mount in operative connection with the force attenuating liner, the visor mount being adapted to have a visor mounted thereto; and a chin strap attached to the force attenuating liner;

a visor pivotably mounted to the visor mount so that the visor is pivotable to a stowed state between the force attenuating liner and the rigid shell, wherein the force attenuating liner is adapted to disconnect from operative connection with the rigid shell under a predetermined load, the visor mount being adapted to remain in connection with the force attenuating liner upon disconnection of the force attenuating liner from operative connection with the rigid shell.

2. The protective helmet of claim 1 wherein the visor mount includes a section that extends at least partially around an outer surface of the force attenuating liner.

3. The protective helmet of claim 2 wherein the section of the visor mount extends over a top of the force attenuating liner.

4. The protective helmet of claim 3 wherein the rigid shell includes a rib extending side to side over a top of the dome-shaped section, at least a portion of the visor mount being located within an interior portion of the rib.

5. The protective helmet of claim 3 wherein the dome-shaped section of the rigid shell includes a rib extending front to back, at least a portion of the visor mount being located within the top center portion of the rib.

6. The protective helmet of claim 3 wherein the dome-shaped section of the rigid shell is generally rounded over the dome-shaped section, at least a portion of the visor mount being located adjacent to an interior surface of the dome shaped section.

7. The protective helmet of claim 2 wherein the section of the visor mount extends around a side of the force attenuating liner.

8. The protective helmet of claim 2 wherein the section of the visor mount extends around a perimeter of the force attenuating liner.

9. The protective helmet of claim 1 wherein the visor mount and the force attenuating liner are operatively connected to the rigid shell via a connector which disconnects from operative connection with the rigid shell under a predetermined load.

10. The protective helmet of claim 1 wherein the visor mount is operatively connected to the rigid shell via a connector which disconnects from operative connection with the rigid shell under a predetermined load.

11. The protective helmet of claim 10 wherein the force attenuating liner is connected to the visor mount so that upon disconnection of the visor mount from the rigid shell, the force attenuating liner disconnects from operative connection with the rigid shell and remains connected to the visor mount.

* * * * *